United States Patent
Schultz et al.

(10) Patent No.: US 10,051,986 B2
(45) Date of Patent: Aug. 21, 2018

(54) LID FOR A PRESSURE COOKING POT AND PRESSURE COOKING POT HAVING A LID

(75) Inventors: Horst Schultz, Hochheim (DE); Siegfried Lapawa, Solingen (DE)

(73) Assignee: SILAG HANDEL AG, Langenfeld (DE)

( * ) Notice: Subject to any disclaimer, the term of this patent is extended or adjusted under 35 U.S.C. 154(b) by 1311 days.

(21) Appl. No.: 13/808,222

(22) PCT Filed: Sep. 27, 2010

(86) PCT No.: PCT/EP2010/005888
§ 371 (c)(1),
(2), (4) Date: Jan. 3, 2013

(87) PCT Pub. No.: WO2012/003853
PCT Pub. Date: Jan. 12, 2012

(65) Prior Publication Data
US 2013/0104875 A1 May 2, 2013

(51) Int. Cl.
*A47J 27/08* (2006.01)
*A47J 27/09* (2006.01)
*A47J 45/07* (2006.01)

(52) U.S. Cl.
CPC ....... *A47J 27/0804* (2013.01); *A47J 27/0813* (2013.01); *A47J 27/09* (2013.01); *A47J 45/074* (2013.01)

(58) Field of Classification Search
CPC ............... A47J 27/0804; A47J 27/0806; A47J 27/0808; A47J 27/0811; A47J 27/0813; A47J 27/0815; A47J 36/06; A47J 36/10; A47J 45/07
See application file for complete search history.

(56) References Cited

U.S. PATENT DOCUMENTS

| | | | | |
|---|---|---|---|---|
| 4,148,250 A | * | 4/1979 | Miki et al. | 99/403 |
| 4,185,752 A | * | 1/1980 | Basile | 220/314 |
| 4,627,417 A | * | 12/1986 | von der Becke et al. | 126/369 |
| 6,513,420 B1 | * | 2/2003 | Park | 99/337 |
| 2004/0250687 A1 | * | 12/2004 | Schultz | 99/337 |
| 2009/0064868 A1 | * | 3/2009 | Cartossi | 99/337 |
| 2009/0301311 A1 | * | 12/2009 | Cartigny et al. | 99/337 |

FOREIGN PATENT DOCUMENTS

| | | |
|---|---|---|
| DE | 202009015975 | 4/2010 |
| EP | 1 342 440 | 9/2003 |
| WO | WO 03/015594 | 2/2003 |

\* cited by examiner

*Primary Examiner* — David J Laux
(74) *Attorney, Agent, or Firm* — Henry M. Feiereisen LLC

(57) ABSTRACT

A lid for a pressure cooking pot includes a lower lid module having an edged lid fitted on a pouring edge of the pressure cooking pot, and a seal sealing the lower lid module when fitted on the pouring edge. An upper lid module includes a closure unit movable between a first position in which the upper and lower lid modules are locked to one another and a second position in which the upper module is separable from the lower module. Fixing claws are coupled to the closure unit and engages under the pouring edge of the pressure cooking pot, when the closure unit is in the first position.

26 Claims, 8 Drawing Sheets

# LID FOR A PRESSURE COOKING POT AND PRESSURE COOKING POT HAVING A LID

CROSS-REFERENCES TO RELATED APPLICATIONS

This application is the U.S. National Stage of International Application No. PCT/2010/005888, filed Sep. 27, 2010, which designated the United States and has been published as International Publication No. WO 2012/003853 and which claims the priority of German Patent Application, Serial No. 10 2010 012 194.9, filed Jul. 5, 2010, pursuant to 35 U.S.C. 119(a)-(d).

FIELD OF THE INVENTION

The invention relates to a lid for a pressure cooking pot. In particular, the invention relates to a lid for pressure cooking pots having a pouring edge, these pots also being usable as conventional pots.

BACKGROUND OF THE INVENTION

Pressure cooking pots are cooking devices which operate by the principle of increasing the boiling point. Such pressure cooking pots are provided with a lid having a pressure relief valve, via which the desired working pressure of the pot is determined. Food can thus be cooked at temperatures of generally approximately 120° C. in a much shorter time.

Pressure cooking pots are formed as pressure containers and must meet high safety requirements. Conventional pressure cooking pots generally comprise a pot, which is provided with peripheral grooves or the like, in which an adapted lid can be latched. Pressure cooking pots are generally unsuitable for use as a normal cooking pot for depressurized cooking owing to the latching means provided on the pot.

European patent EP 1416837 B1 (inventor: Horst Schulz) therefore proposes a lid for a pressure cooking pot, which lid comprises claws curved in a U-shaped manner by means of which the lid can be latched on the pouring edge of a pot shaped "normally".

This pot provided with a pouring edge is much more suitable for use as a normal cooking pot. One drawback is that the entire lid of the pot has to be changed for normal, depressurized use.

According to the teaching of EP 1416837 B1, the latching claws can be removed for cleaning. This is relatively complex, however, since a nut on the underside of the lid has to be detached for this purpose. To this end, a tool generally has to be used.

The lid provided with the claws is also hardly suitable for use as a normal cooking pot lid in the unlatched state. It is therefore necessary to have a second lid available for depressurized operation of the cooking pot.

Furthermore, the design of the lid is relatively involved and complicated.

OBJECT OF THE INVENTION

The object of the invention is to provide a lid for a pressure cooking pot, the manageability of which is improved.

In particular, one object of the invention is to convert the lid, in a simple manner, to a normal lid without latching. Assembly and cleaning of the lid are also to be simplified.

SUMMARY OF THE INVENTION

The object of the invention is solved by a lid for a pressure cooking pot according to any one of the independent claims. Preferred embodiments and developments of the invention are to be inferred from the respective dependent claims.

The invention relates to a lid for a pressure cooking pot, in particular a lid which can be latched on conventional pots with a pouring edge.

The lid comprises an edged lid with a seal and a grip. An edged lid is understood to mean a lower lid with a peripheral web or edge and which comprises a seal and can be inserted into the pot. The lid further comprises a grip, which is normally formed as a button and by means of which the lid can be lifted off from the pot.

In order to create a pressure-tight container, the lid can be latched on the cooking pot.

According to the invention, the grip comprises means in order to be lifted off from the edged lid together with at least part of a latching mechanism.

The lid thus comprises two modules, namely a lower lid module with an edged lid, and an upper module with a grip and a latching mechanism.

Since means for removing said grip from the edged lid together with the latching mechanism are provided on the grip itself, it can be removed in a very simple manner, for example without screws having to be detached from the lower part of the lid.

The edged lid comprises means to which the grip can be fixed. Once the grip together with the latching mechanism has been removed, the grip can be replaced by a conventional grip without a latching mechanism.

A normal lid is thus produced from the edged lid together with this further grip, said lid being well-suited for conventional cooking.

Owing to this simple exchangeability, the user does not need to have two different lids available, namely a lid for pressure cooking and a lid for depressurized cooking.

The cleaning of the lid is also facilitated since the mechanism for removing the grip and the latching mechanism is provided in the upper side of the lid.

An actuation of a screw for example on the underside of the lid generally hinders the cleaning process, since the underside may be dirtied by food residues after the cooking process. In a development of the invention the grip can be fixed to a valve attached preferably centrally on the edged lid.

In this embodiment of the invention, the valve housing, which is pin-shaped for example, can be used to fix a grip thereon. The grip does not therefore have to be fixed by a special threaded bolt or the like, and the valve fixed on the edged lid does not interfere when the edged lid is used as a normal lid for depressurized cooking, but is formed as a seat for the further grip.

As provided in a preferred embodiment of the invention, at least one valve is thus arranged in the grip.

This valve is used in one embodiment of the invention to fix the working pressure of the pot. This means that the valve arranged in the grip opens at the desired working pressure and thus regulates the temperature, prevailing inside the pot, by the boiling point of water.

In an alternative embodiment of the invention however, a safety valve may also be integrated in the grip instead of the valve for fixing the working pressure, said safety valve being provided as a second valve which opens at a higher pressure in case the other valve fails and/or which locks the latching mechanism of the lid at pressure so that it cannot be opened.

In a development of the invention the valve is adjustable. For example, this is possible in a simple manner since the bias of a valve spring can be adjusted by means of a set screw.

Different pressure stages for cooking at different temperatures can be set by the user by such an adjustable valve.

In a preferred embodiment of the invention the lid can be removed via a slider mechanism. Such a slider mechanism comprises a slider, which is positively connected in one position to the collar of a fixing bolt of a valve housing for example. The slider is slid into a position by shifting a controller, in which position the positive connection is released. The grip can thus be removed in a very simple manner at the push of a button.

In a preferred embodiment of the invention the latching mechanism is actuatable by means of the grip. In particular, claws with U-shaped ends are used as a latching mechanism and engage in the pouring edge of a pot and carry out a movement directed at least inwardly, that is to say in the direction of the central axis of the pot, when the grip is turned.

The direction of movement of the claws preferably extends upwardly at the same time in the direction of the button. In the latched state an inwardly directed force is thus exerted onto the claws in the event of pressure build-up.

An unlatching is therefore only possible with a high expenditure of force, or is impossible, in particular at a relatively high pressure. This may also further improve the safety of the pot in combination with a safety valve, which locks the latching mechanism.

The pot preferably comprises two valves, namely a valve for fixing the working pressure and a safety valve, which for example locks the latching mechanism at pressure so that the pot cannot be opened. The safety valve may also be designed in such a way that it is actuated at a higher pressure than the other valve, should this other valve fail.

In a preferred embodiment of the invention the latching mechanism of the lid is latched in the unpressurized state by at least one of the valves. To this end for example, the pin of a safety valve engages in a corresponding recess in the grip and, when the pot is pressurized, thus blocks a rotation of the grip, with which the latching mechanism of the lid is actuated.

At least one of the valves may also actuate a pin, which is attached on the removable part of the lid—in particular on the grip.

For example, this pin may be used to visually signal to the user the pressure provided.

In one embodiment of the invention the lid comprises a middle plate, which is arranged between the grip and the edged lid and to which claws for latching of the lid are attached.

The removable module is formed with the latching mechanism and the grip above the middle plate. In particular, the middle plate is used for attachment of the latching mechanism. The grip and/or the middle plate is/are preferably connected to the edged lid so as not to be axially rotatable when the grip is fitted on, whereas the grip is fixed rotatably on the middle plate so that claws for latching the lid can be actuated by the grip.

In a development of the invention the middle plate can be removed together with the grip and a duct is arranged between the middle plate and the edged lid, through which duct steam which discharges via at least one valve can escape.

This duct can be cleaned particularly easily in the removed state.

It is also particularly advantageous if the steam only escapes through the duct between the middle plate and the edged lid, and is not diverted along the mechanical elements of the latching mechanism. Food residues which are transported together with the steam can therefore only come into contact with the duct, which can be formed so as to be easily cleanable and with no covered surfaces.

The lid preferably consists of two separable modules, wherein one module comprises a grip and the latching mechanism for latching the lid on the pouring edge of a pot, and the other module comprises an edged lid for covering the pot.

The invention further relates to a lid for a pressure cooking pot—in particular having one or more of the above-described features—which comprises an edged lid with a seal and at least one valve.

According to the invention a latching mechanism is arranged on a middle plate, which is in turn arranged between the edged lid and grip.

The middle plate can be removed from the edged lid together with the latching mechanism, wherein a duct is formed between the middle plate and the edged lid, through which duct steam, which discharges from at least one valve, can be released into the open.

Owing to the use of a duct arranged between a middle plate and an edged lid, it is possible to largely prevent steam from coming into contact with the mechanics of the latching mechanism and to prevent particles present in the steam from contaminating the latching mechanism, which is relatively difficult to clean.

The invention further relates to a lid for a pressure cooking pot, which comprises an edged lid with a seal and at least one valve for fixing the working pressure.

Furthermore, the lid comprises a safety valve and a grip. According to the invention at least one of the valves is arranged in the grip, and, in particular if it is attached to the edged lid, can serve as a seat to which the grip of the lid is fixed.

BRIEF DESCRIPTION OF THE DRAWINGS

The invention will be explained hereinafter in greater detail with reference to drawings FIG. 1 to FIG. 10.

In the drawings.

DETAILED DESCRIPTION OF THE DRAWINGS

Figure 1:
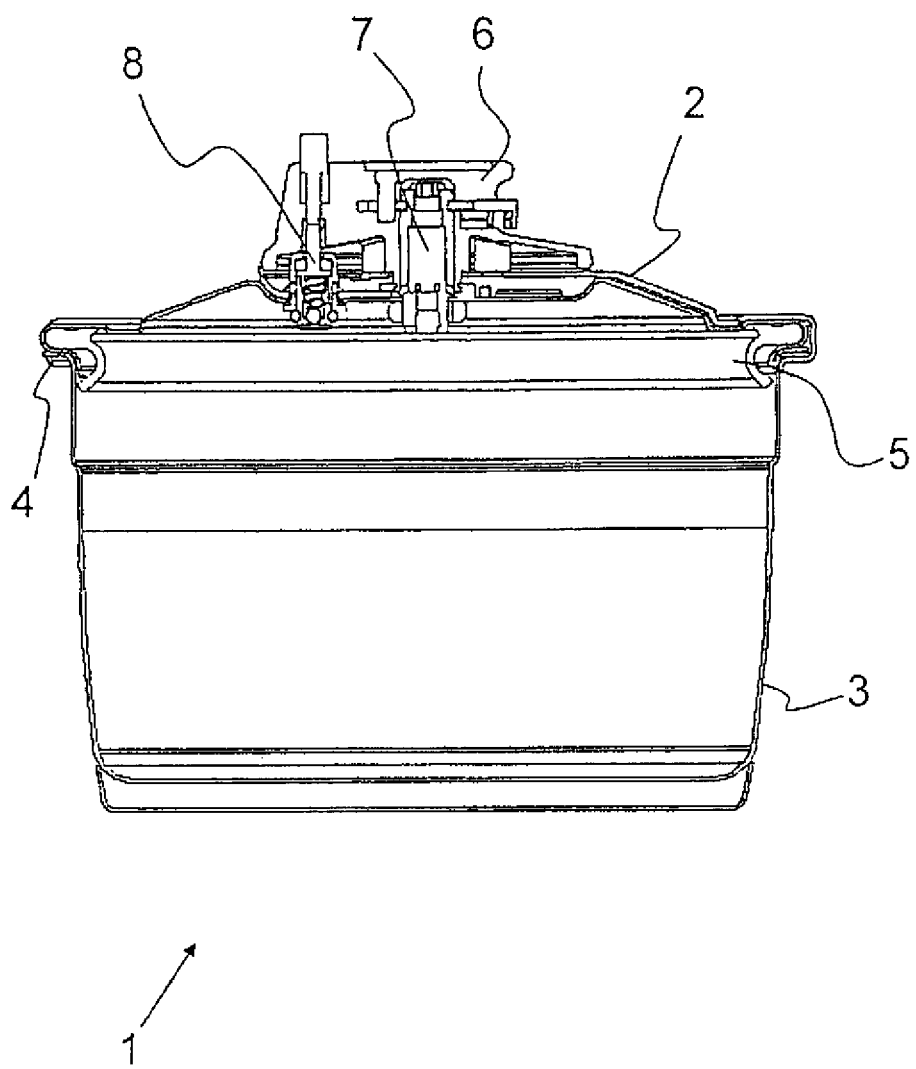
FIG. 1 shows a schematic sectional view of a pressure cooking pot with the lid fitted.

FIG. 1 shows a schematic sectional view of a pressure cooking pot 1 according to one embodiment of the invention.

Figure 3:
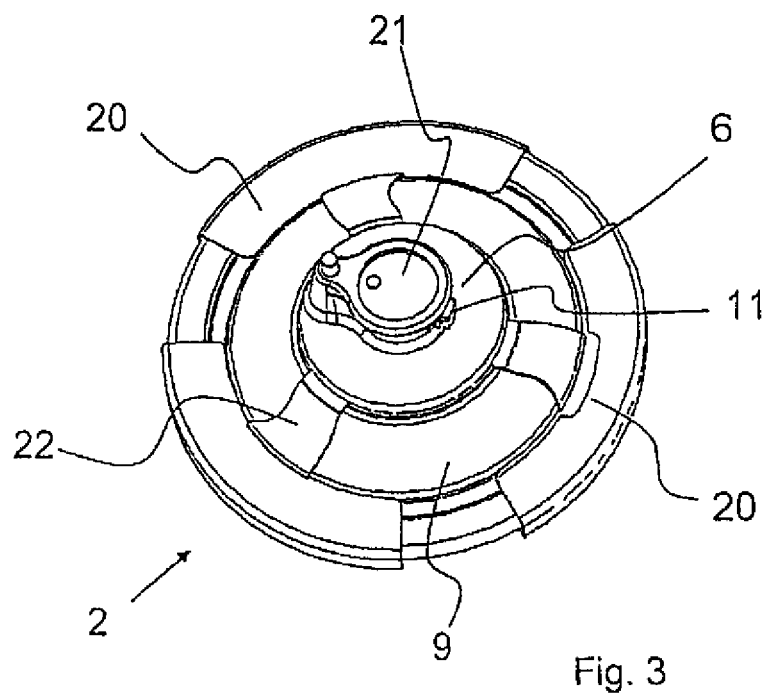
FIG. 3 shows a perspective view of a lid for a pressure cooking pot.
Figure 5:
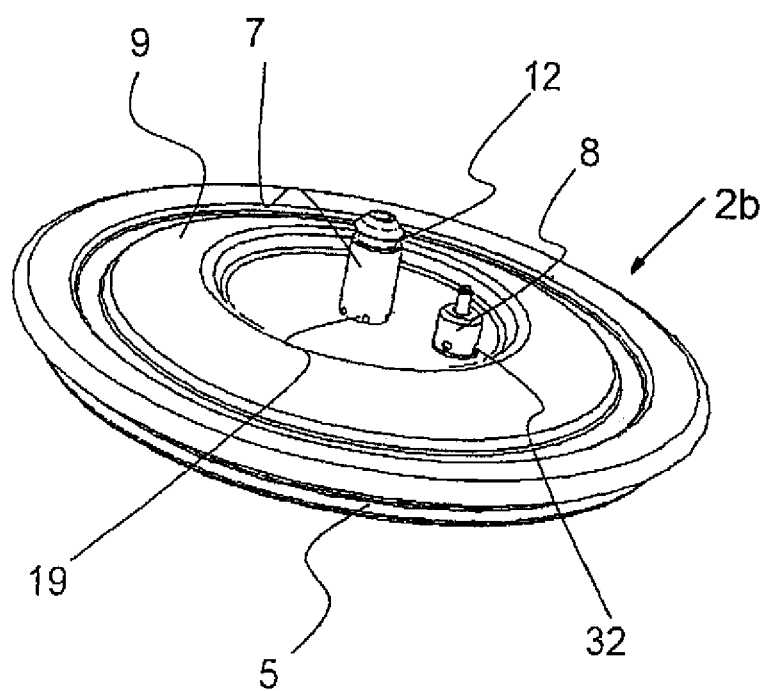
FIG. 5 shows a perspective view of the lower module of a lid.

The pressure cooking pot 1 comprises a pot 3 with a pouring edge 4 and a lid 2 having an upper lid module 2a, shown in greater detail in FIG. 3, and a lower lid module 2b, shown in greater detail in FIG. 5.

The pressure cooking pot 1 is formed as a pressure container. A latching mechanism can be actuated via the grip 6, with which latching mechanism the lid 2 is latched on the pouring edge 4 of the pot. The pot is sealed by the lip seal 5.

The lid 2 comprises a valve 7 for fixing the working pressure and a safety valve 8.

Figure 2:
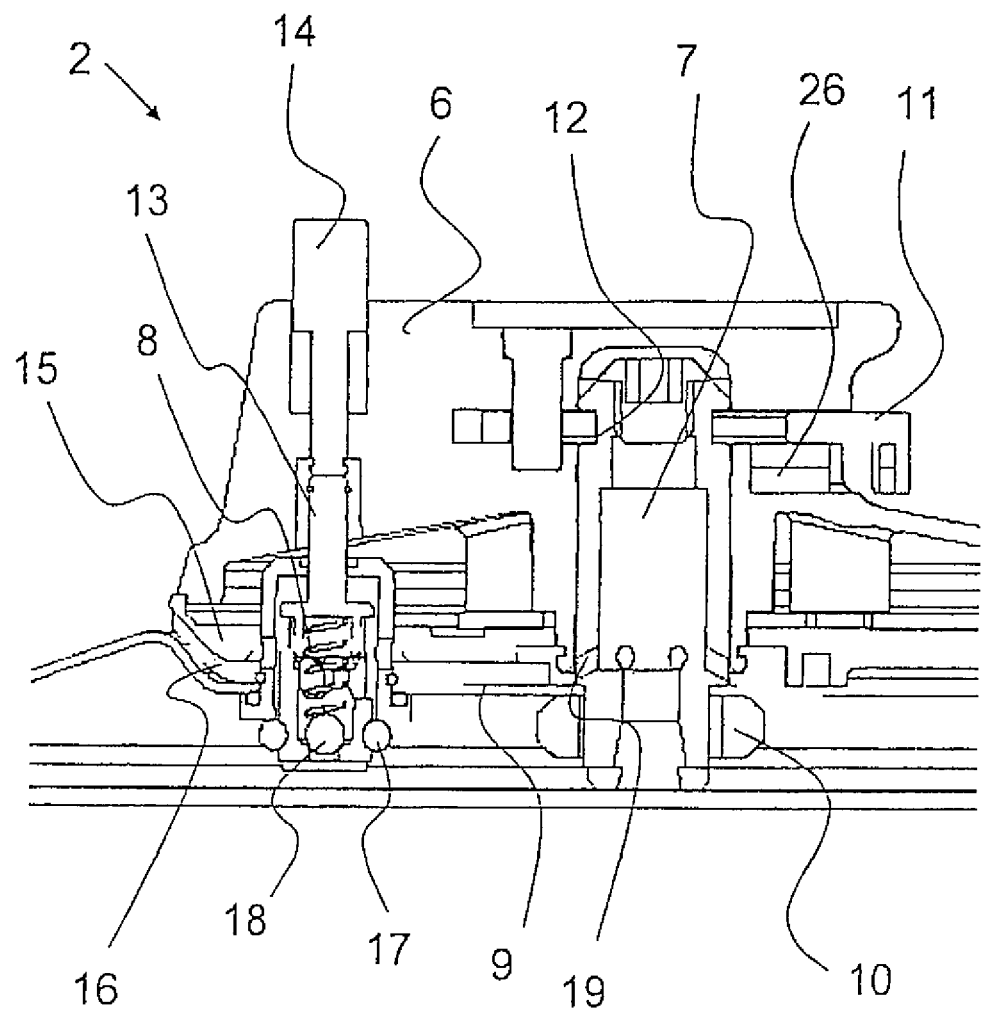
FIG. 2 shows a detail of the sectional view illustrated in FIG. 1.

FIG. 2 shows a detailed view of the lid illustrated in FIG. 1, in which the details, in particular the valve arrangement, can be better seen.

The lower lid module 2b comprises an edged lid 9 which is fitted on the pot and which is provided with a seal 5, as shown in Fig. 1.

A first valve 7 is attached to the edged lid 9, via which valve the working pressure of the pressure cooking pot is fixed. The valve 7 (in this case only the valve housing is illustrated) is fixed centrally on the edged lid 9 by a nut 10.

Furthermore, the upper lid module 2a of the lid 2 comprises a closure unit in the form of a grip 6, which is attached rotatably on the housing of the valve 7. For this purpose, the housing of the valve 7 comprises a peripheral groove 12, in which the closure unit 6 can be fixed by means of a slider 11. For this purpose, a duct 26 for a spring (not illustrated) is preferably provided, with which the slider 11 is pressed outwardly.

By pressing on the slider 11, said slider 11 can be displaced against the force of the spring into a position in which the positive connection in the groove 12 in the housing of the valve 7 is released.

The closure unit 6 is further connected rotatably to a middle plate 15 which also forms part of the upper lid module 2a.

By rotating the closure unit 6, the lid 2 can be latched via fixing claws 20 which form part of the upper lid module 2a, as will be illustrated in greater detail hereinafter with reference to further drawings.

The edged lid 9 also comprises a further valve, which is arranged deaxially and which is formed in this embodiment as a safety valve 8. The safety valve 8 is also fixed on the edged lid 9. The valve 8 is formed as a spherical valve with a ball 18, which is pressed against a sealing face by means of a spring. A sealing ring 17 acts as the seal of the valve housing.

It is understood that further sealing means may also be provided in relation to the valve 7.

The upper part of the valve 8 comprises an upper part 13, by means of which a cooking pin 14 arranged in the closure unit 6 can be actuated.

Using the cooking pin 14, it is possible to determine whether the pot is pressurized.

The upper part 13, which engages in a recess in the closure unit 6 at pressure, prevents the closure unit 6 from being turned when the pot is pressurized, and thus prevents the latching mechanism from being actuated.

Furthermore, the pressure can be released from the pressure cooking pot 1 by pressing down on the cooking pin 14 so as to then open the pressure cooking pot 1.

Both the valve housing of the valve 7 and the valve housing of the valve 8 have lateral ducts 19, via which steam can escape into a duct 16 formed between the edged lid 9 and the middle plate 15.

Since the middle plate 15 can be removed together with the closure unit 6, the duct 16 is particularly easy to clean.

In particular, steam does not discharge at the claws of the latching mechanism as a result of this arrangement.

FIG. 3 shows a perspective view of the lid with the upper lid module 2a and the lower lid module 2b in an assembled state. The edged lid 9, which is enclosed by three U-shaped fixing claws 20 can be seen. The fixing claws 20 are coupled to the closure unit 6 via connecting webs 22.

The closure unit 6 has a button 21, via which the entire lid 2 can be removed. To actuate the latching mechanism, the closure unit 6 can be rotated at the button 21. The fixing claws 20 move inwardly when latching the pot 3 and grip beneath the pouring edge 4 of the pot 3.

To remove the upper lid module 2a comprising the closure unit 6 and the latching mechanism, the slider 11 can be pressed and an upper module, which comprises the latching mechanism, can be removed.

Figure 4:
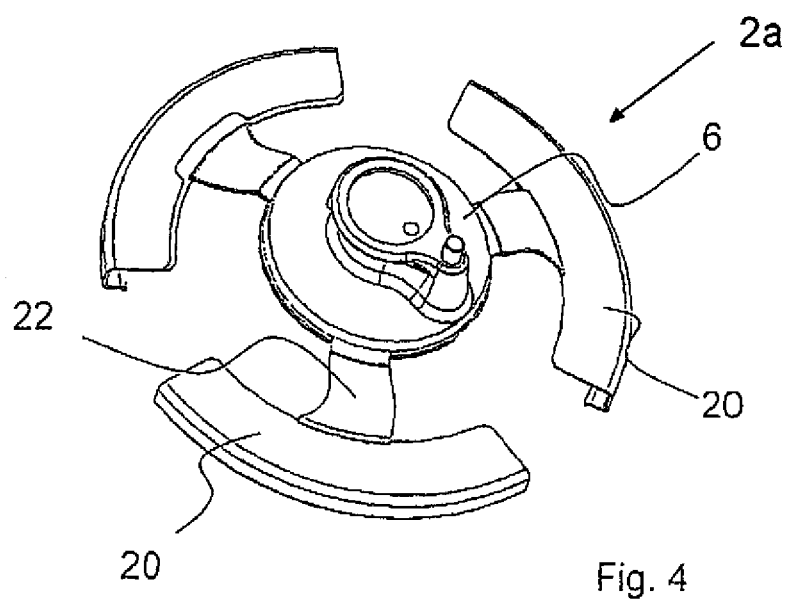
FIG. 4 shows a perspective view of an upper module with the latching mechanism.

The components of the upper lid module 2a are illustrated in perspective view according to FIG. 4.

The three fixing claws 20, which are coupled to closure unit 6 via connecting webs 22 can be seen.

Once the upper lid module 2a has been removed, the edged lid 9, which comprises a peripheral seal 5, remains, as illustrated in the perspective view according to FIG. 5. Furthermore, the valve 7, which comprises a groove 12 for fixing of the closure unit 6, is attached to the edged lid 9. In this view, ducts 19 arranged on the housing of the valve 7 and via which the steam can escape can be seen clearly.

The safety valve 8 is also arranged on the edged lid 9 and also comprises ducts 32, via which the pressure can escape.

The lower lid module 2b of the lid 2 can now be provided with a new cover (not illustrated) without a latching mechanism and can thus be used as a cover for depressurized cooking.

This cover preferably covers both the valve 7 and the safety valve 8. Owing to the use of the valve 7 as a retaining pin for the closure unit 6 and owing to the fact that the valve 8 is arranged in the direct vicinity, it is possible to cover both valves with one cover. The lid 2 thus does not differ visually from a conventional lid for depressurized cooking. A second lid does not have to be kept available for depressurized cooking.

Figure 6:
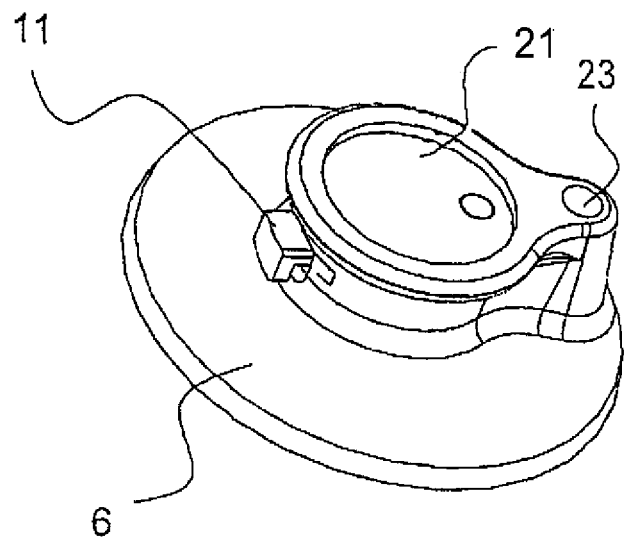
FIG. 6 and FIG. 7 show details of the grip.

FIG. 6 shows a perspective view of the closure unit 6 of the upper lid module 2a, which comprises the slider 11 for removing the closure unit 6, together with the latching mechanism (not illustrated). The slider 11 is fixed in the closure unit with a pin 23.

Figure 7:
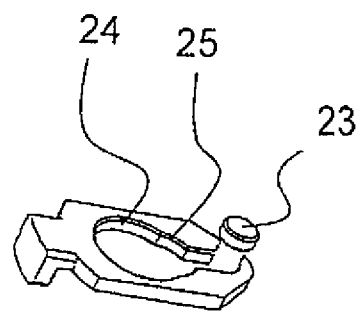

FIG. 7 illustrates a perspective view of the slider 11.

The slider 11 comprises a recess 24 of greater diameter and a further recess 25 of smaller diameter intersecting this recess 24. In the basic state, that is to say if the slider 11 is not pressed in, the recess 25 of smaller diameter sits beneath a collar arranged on the valve housing and thus ensures a positive connection in the groove 12.

When the slider 11 is pressed, it is moved from its idle position into a position in which the recess 24 of greater diameter coincides axially with the collar of the corresponding valve 7. The positive connection is thus released and the closure unit can be removed.

The pin 23 prevents the slider 11 from being pushed out of its housing, which is formed by the closure unit 6, by the provided spring (not illustrated).

Figure 8:
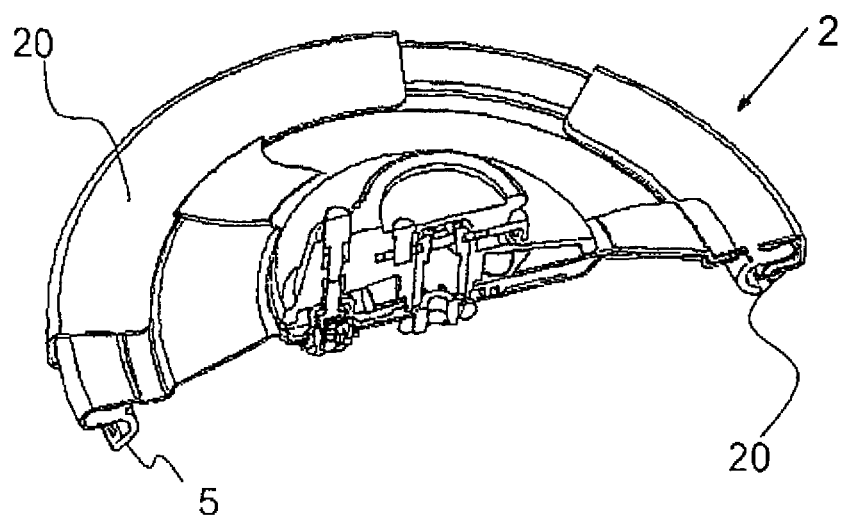
FIG. 8 shows a perspective view of a lid, which is cut along a plane lying on the centre axis of the lid.

FIG. 8 shows a perspective view of a lid, said view being cut along a plane extending axially. The U-shaped fixing claws 20, which can grip beneath the pouring edge 4 of a pot 3 (not illustrated here) can be seen clearly. The pot 3 is sealed via the lip seal 5.

Figure 9:
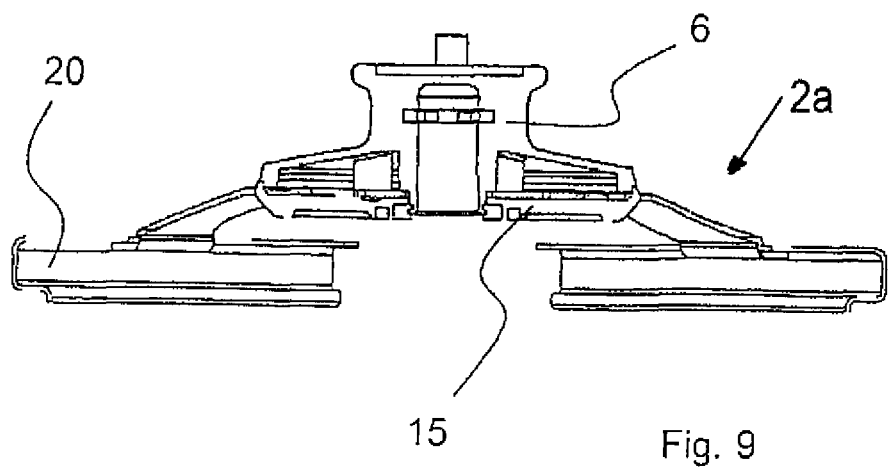
FIG. 9 shows a further sectional view of a lid.

FIG. 9 shows a sectional view of the upper lid module 2a, which comprises the closure unit 6 and the fixing claws 20.

The middle plate 15 is provided to fix the closure unit 6 and the fixing claws 20 and, in the assembled state, lies between the edged lid 9 of the lower lid module 2b and the closure unit 6 of the upper lid module 2a.

Figure 10:
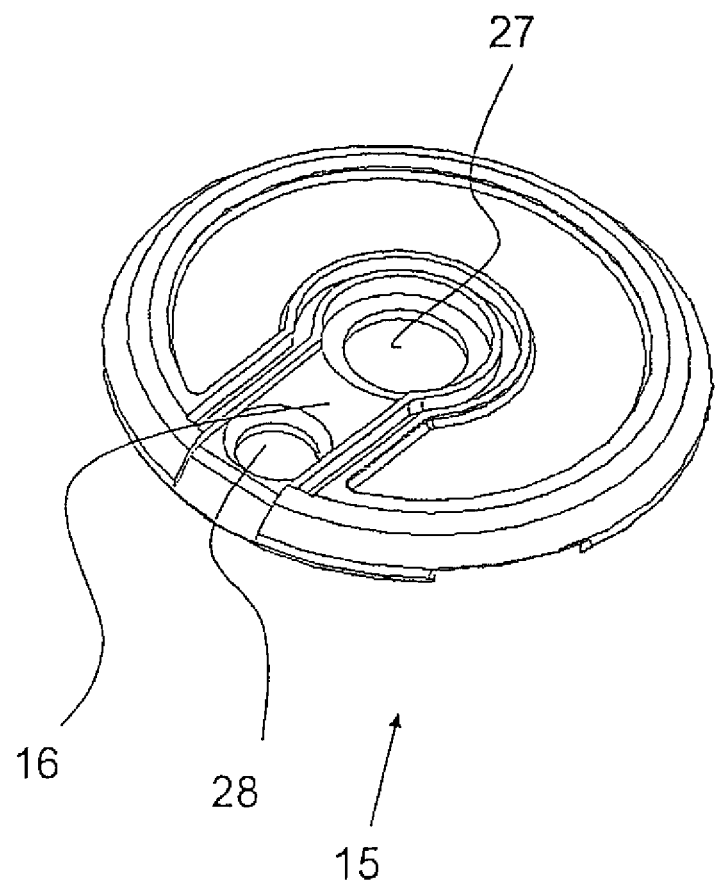
With reference to FIG. 10, details of a middle plate of the lid will be explained.

Further details will be explained with reference to FIG. 10, which shows a perspective view of the middle plate 15.

The middle plate 15 comprises a central recess 27, which in the assembled state is slid over the valve 7, shown in FIG. 1 arranged centrally on the edged lid 9.

Furthermore, the middle plate 15 comprises a further recess 28, which in the assembled state is slid over the second valve shown in FIG. 1.

Since the housing of the safety valve 8 sits in the recess 28 arranged deaxially, the middle plate 15 is not axially rotatable in relation to the edged lid 9 in the assembled state. The middle plate 15 further comprises the duct 16, through which steam escapes between the middle plate 15 and the edged lid 9 in the assembled state. It is understood that the duct 16 may comprise edge seals, which are not illustrated in greater detail in this embodiment. For example, a groove may be formed at the edge for attachment of a seal.

Figure 11:
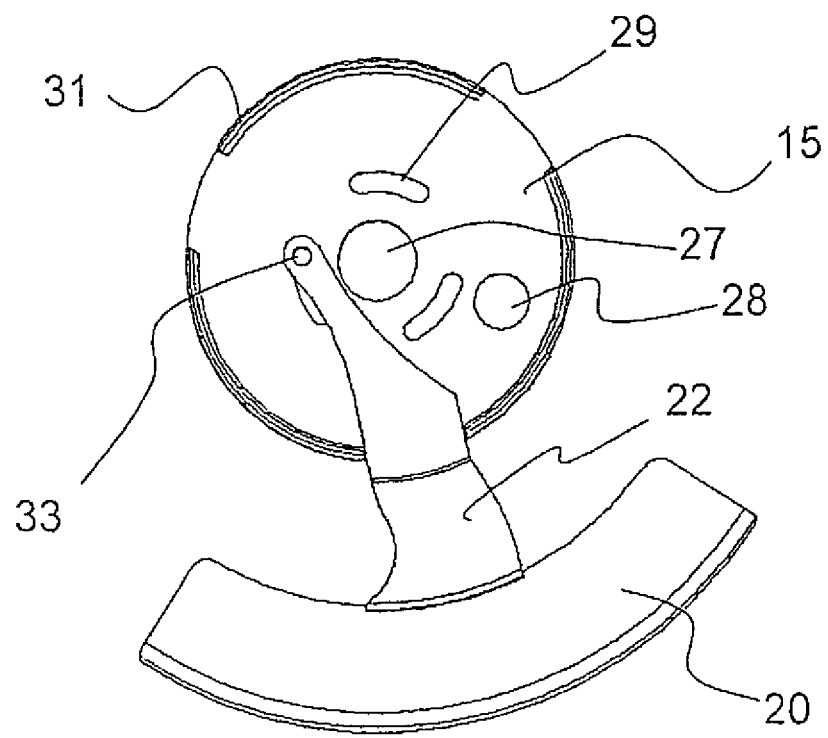
FIG. 11 and FIG. 12 show the latching mechanism of a lid in greater detail.

FIG. 11 shows further details of the middle plate 15 and of the latching mechanism. The middle plate 15 comprises an edge web 31, which is recessed in the region of the connecting webs 22 to the fixing claws 20.

As already described, the middle plate 15 is fixed axially in the assembled state owing to the recess 28.

The connecting webs 22 comprise recesses 33, which cooperate with the closure unit 6, as illustrated hereinafter.

The middle plate 15 comprises circular segment-shaped grooves 29 for guiding the connecting webs 22 with the fixing claws 20.

Figure 12:
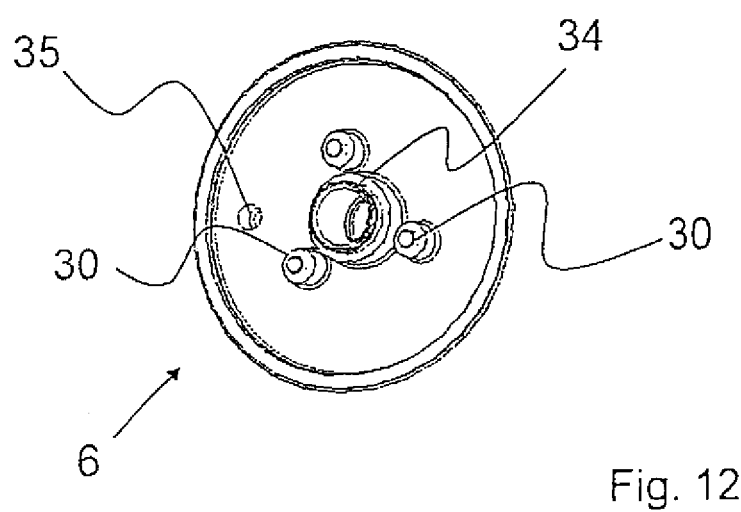

FIG. 12 shows a perspective view of the underside of the closure unit 6 of the upper lid module 2a. The closure unit 6 comprises pins 30, which, in the assembled state, engage in the recesses 33 in the connecting webs 22 illustrated in FIG. 11. If the button 11 of the closure unit 6 of the upper lid module 2a is now turned relative to the middle plate 15, the pins 30 extend into the grooves 29 and the fixing claws 20 can thus be moved outwardly or inwardly.

The pins 30 are preferably mushroom-shaped and may be used to fix the middle plate 15, connecting webs 22 and closure unit 6, since these have a greater diameter beneath the recesses 29.

The recess 27 and a tubular portion 34 arranged on the closure unit 6 may also form a hinge, which holds together the middle plate 15 and the closure unit 6.

The lid 6 further comprises the recess 35, in which the upper part of the safety valve (8 in FIG. 2) can engage, and thus prevents a turning of the grip when pressurized.

A pressure cooking pot with simplified handling is provided by this invention.

LIST OF REFERENCE NUMERALS 1 pressure cooking pot
2 lid
3 pot
4 pouring edge
5 seal
6 grip
7 valve
8 safety valve
9 edged lid
10 nut
11 slider
12 groove
13 upper part, safety valve
14 pin
15 middle plate
16 duct
17 sealing ring
18 ball
19 duct, central valve
20 claw
21 button
22 connecting web
23 pin
24 recess
25 recess
26 duct
27 recess
28 recess
29 groove
30 pin
31 web
32 duct
33 recess
34 tubular section
35 recess

The invention claimed is:

1. A lid for a pressure cooking pot, comprising:
a lower lid module including an edged lid fitted on a pouring edge of the pressure cooking pot, and a seal sealing the lower lid module when fitted on the pouring edge; and
an upper lid module including a closure unit movable between a first position in which the upper and lower lid modules are locked to one another and a second position in which the upper module is separable from the lower module, and fixing claws coupled to the closure unit and engaging under the pouring edge of the pressure cooking pot, when the closure unit is in the first position, wherein the edged lid has a surface which forms a mechanical interface, when the upper lid module is removed, for receiving another functional part to provide a conventional cooking pot lid for a depressurized cooking pot or a low-pressure cooking pot.

2. The lid of claim 1, wherein the functional part is a standard middle button or a special vapor button.

3. A pressure cooking pot, comprising a lid comprising a lower lid module including an edged lid fitted on a pouring edge of the pressure cooking pot, and a seal sealing the lower lid module when fitted on the pouring edge, and an upper lid module including a closure unit movable between a first position in which the upper and lower lid modules are locked to one another and a second position in which the upper module is separable from the lower module, and fixing claws coupled to the closure unit and engaging under the pouring edge of the pressure cooking pot, when the closure unit is in the first position, wherein the closure unit includes a fixed pin and a slider which is resiliently received by the pin for movement in a horizontal direction, said slider having a first recess for alignment with a housing of the valve to allow a removal of the upper lid module, when the closure unit is in the second position, and a second recess adjacent to the first recess and receivable in a groove of the valve housing when the closure unit is in the first position.

4. The pressure cooking pot of claim 3, wherein the lower lid module includes a first valve for controlling a working pressure in the pressure cooking pot, said closure unit being detachably connected to a cylindrical housing of the first valve.

5. The pressure cooking pot of claim 4, wherein the first valve is positioned in midsection of the edged lid.

6. The pressure cooking pot of claim 4, wherein the housing of the first valve is formed as a hollow cylinder.

7. The pressure cooking pot of claim 3, wherein the slider is constructed to extend outwardly from the closure unit to enable actuation thereof.

8. The pressure cooking pot of claim 7, further comprising a cooking pin received in the closure unit for indicating a pressurized state of the pressure cooking pot, said closure unit having a bore for engagement by the cooking pin to prevent a movement between the closure unit and the middle plate, when the cooking pot is pressurized.

9. The pressure cooking pot of claim 3, wherein the upper lid module has an axially fixed middle plate which is operably connected to the closure unit and closes the upper lid module towards the edged lid of the lower lid module, said claws being movably connected to the middle plate by connecting webs, said closure unit being rotatably mounted centrally on an edged-lid-distal side of the middle plate and having vertical pins engaging rotatably in the connecting webs and guided in circular segment-shaped grooves in the middle plate to allow a radial movement of the claws when the closure unit is moved axially between the first and second positions.

10. The pressure cooking pot of claim 9, wherein the edged lid has a surface which forms a mechanical interface, when the upper lid module is removed, for receiving another functional part to provide a conventional cooking pot lid for a depressurized cooking pot or a low-pressure cooking pot.

11. The pressure cooking pot of claim 10, wherein the functional part is a standard middle button or a special vapor button.

12. The pressure cooking pot of claim 3, wherein the closure unit includes a cavity in the shape of a button and being formed as a grip for receiving the slider and the fixed pin, and further comprising a cooking pin received in the button-like cavity for indicating a pressurized state of the pressure cooking pot.

13. The pressure cooking pot of claim 4, further comprising a second safety valve attached on the edged lid next to the first valve for controlling overpressure via a duct-like discharge opening.

14. The pressure cooking pot of claim 5, wherein the lid includes a second safety valve attached on the edged lid next to the first valve for controlling overpressure via a duct-like discharge opening wherein the middle plate is fixed in position by the housing of the second valve and has a first recess for receiving the housing of the first valve and a second recess for receiving a housing of the second valve, with steam being able to exit via a discharge opening of the housing of the first valve and a discharge opening of the housing of the second valve and via a duct on an edged-lid-distal side of the middle plate to the atmosphere without contacting the closure unit of the upper lid module.

15. The pressure, cooking pot of claim 14, wherein the duct is formed by a doubly formed boundary to define a gap for receiving a seal.

16. A lid for a pressure cooking pot, comprising:
 a lower lid module including an edged lid fitted on a pouring edge of the pressure cooking pot, and a seal sealing the lower lid module when fitted on the pouring edge; and an upper lid module including a closure unit movable between a first position in which the upper and lower lid modules are locked to one another and a second position in which the upper module is separable from the lower module, and fixing claws coupled to the closure unit and engaging under the pouring edge of the pressure cooking pot, when the closure unit is in the first position, wherein the closure unit includes a fixed pin and a slider which is resiliently received by the pin for movement in a horizontal direction, said slider having a first recess for alignment with a housing of the valve to allow a removal of the upper lid module, when the closure unit is in the second position, and a second recess adjacent to the first recess and receivable in a groove of the valve housing when the closure unit is in the first position.

17. The lid of claim 16, wherein the lower lid module includes a first valve for controlling a working pressure in the pressure cooking pot, said closure unit being detachably connected to a cylindrical housing of the first valve.

18. The lid of claim 17, wherein the first valve is positioned in midsection of the edged lid.

19. The lid of claim 17, wherein the housing of the first valve is formed as a hollow cylinder.

20. The lid of claim 17, further comprising a second safety valve attached on the edged lid next to the first valve for controlling overpressure via a duct-like discharge opening.

21. The lid of claim 16, wherein the slider is constructed to extend outwardly from the closure unit to enable actuation thereof.

22. The lid of claim 16, wherein the upper lid module has an axially fixed middle plate which is operably connected to the closure unit and closes the upper lid module towards the edged lid of the lower lid module, said claws being movably connected to the middle plate by connecting webs, said closure unit being rotatably mounted centrally on an edged-lid-distal side of the middle plate and having vertical pins engaging rotatably in the connecting webs and guided in circular segment-shaped grooves in the middle plate to allow a radial movement of the claws when the closure unit is moved axially between the first and second positions.

23. The lid of claim 22, further comprising a second safety valve attached on the edged lid next to the first valve for controlling overpressure via a duct-like discharge opening wherein the middle plate is fixed in position by the housing of the second valve and has a first recess for receiving the housing of the first valve and a second recess for receiving a housing of the second valve, with steam being able to exit via a discharge opening of the housing of the first valve and a discharge opening of the housing of the second valve and via a duct on an edged-lid-distal side of the middle plate to the atmosphere without contacting the closure unit of the upper lid module.

24. The lid of claim 22, further comprising a cooking pin received in the closure unit for indicating a pressurized state of the pressure cooking pot, said closure unit having a bore for engagement by the cooking pin to prevent a movement between the closure unit and the middle plate, when the cooking pot is pressurized.

25. The lid of claim 16, wherein the closure unit includes a cavity in the shape of a button and being formed as a grip for receiving the slider and the fixed pin, and further comprising a cooking pin received in the button-like cavity for indicating a pressurized state of the pressure cooking pot.

26. The lid of claim 23, wherein the duct is formed by a doubly formed boundary to define a gap for receiving a seal.

\* \* \* \* \*